(12) United States Patent
Martinez

(10) Patent No.: US 9,227,574 B1
(45) Date of Patent: Jan. 5, 2016

(54) TRUCK BED STORAGE DEVICE

(71) Applicant: Edward Martinez, West Sacremento, CA (US)

(72) Inventor: Edward Martinez, West Sacremento, CA (US)

(*) Notice: Subject to any disclaimer, the term of this patent is extended or adjusted under 35 U.S.C. 154(b) by 0 days.

(21) Appl. No.: 14/656,186

(22) Filed: Mar. 12, 2015

(51) Int. Cl.
*B60R 9/06* (2006.01)
*B60R 7/02* (2006.01)
*B60R 11/00* (2006.01)

(52) U.S. Cl.
CPC ... *B60R 9/06* (2013.01); *B60R 7/02* (2013.01); *B60R 2011/0071* (2013.01); *Y10S 224/925* (2013.01)

(58) Field of Classification Search
CPC .............. B60R 9/06; B60R 2011/0071; Y10S 224/925
USPC ............... 224/403, 405, 925, 539; D12/414.1
See application file for complete search history.

(56) References Cited

U.S. PATENT DOCUMENTS

| | | | | |
|---|---|---|---|---|
| D256,451 S | * | 8/1980 | Verry | D12/404 |
| 4,767,149 A | * | 8/1988 | Rye | B60R 13/01 224/403 |
| 4,770,330 A | * | 9/1988 | Bonstead | B60R 11/06 224/404 |
| D300,734 S | * | 4/1989 | Kruitbosch | D12/414 |
| 5,090,763 A | * | 2/1992 | Kremer | B60R 13/01 296/39.1 |
| 5,137,158 A | * | 8/1992 | Brockway | B60R 7/02 211/106.01 |
| 5,240,301 A | * | 8/1993 | Arnold | B60P 7/14 220/533 |
| 5,287,971 A | * | 2/1994 | Dorman | B60R 7/02 211/12 |
| 5,427,288 A | * | 6/1995 | Trubee | B60R 7/02 224/539 |
| 5,464,102 A | * | 11/1995 | LeBlanc | B60R 7/02 211/12 |
| 5,720,507 A | * | 2/1998 | Emery | B60R 13/01 296/39.2 |
| 5,845,951 A | * | 12/1998 | Webb | B60R 7/02 211/12 |
| 6,050,763 A | | 4/2000 | Swailes | |
| 6,062,452 A | * | 5/2000 | Kauskey | B60R 7/02 224/402 |
| 6,138,883 A | * | 10/2000 | Jackson | B60R 9/00 224/404 |
| 6,367,746 B1 | * | 4/2002 | Webb | B60R 7/08 248/150 |
| 6,502,731 B1 | * | 1/2003 | Gehring | B60R 7/02 224/282 |
| 6,616,022 B1 | * | 9/2003 | Naastad | B60R 9/06 224/519 |
| 6,669,067 B2 | * | 12/2003 | Schuster | B60R 7/08 211/12 |
| 7,971,919 B2 | * | 7/2011 | Vertanen | B60P 3/40 296/3 |
| 8,052,019 B2 | * | 11/2011 | Plavetich | B60P 3/06 224/403 |
| 8,070,029 B1 | * | 12/2011 | Settle | B60P 7/0892 224/403 |
| D692,369 S | * | 10/2013 | Mezzanatto | D12/414 |
| D713,323 S | * | 9/2014 | Gearner, III | D12/414.1 |
| 8,931,987 B2 | * | 1/2015 | Hibbard | B60P 7/135 410/121 |
| 2004/0145206 A1 | * | 7/2004 | Hicks | B60R 7/02 296/37.16 |
| 2006/0186157 A1 | * | 8/2006 | Dibble | B60R 9/12 224/405 |
| 2007/0194071 A1 | * | 8/2007 | Hollinger | B60R 7/00 224/542 |

* cited by examiner

*Primary Examiner* — Justin Larson
(74) *Attorney, Agent, or Firm* — Crossley Patent Law

(57) ABSTRACT

A truck bed storage device including a back support having a right end, a left end, a top side, and a bottom side. A bottom support having a top surface and a bottom surface, each of the top surface and the bottom surface having a front edge and a rear edge. The rear edge of the top surface of the bottom support is continuously disposed on the bottom side of the back support from proximal the right end to proximal the left end. A plurality of a pair of ladder hooks wherein each pair comprises a forwardly facing ladder hook and a rearwardly facing ladder hook. A bottom edge of each of the forwardly facing ladder hooks disposed within the top side of the back support. A bottom edge of each of the rearwardly facing ladder hooks disposed within the top surface of the bottom support.

4 Claims, 3 Drawing Sheets

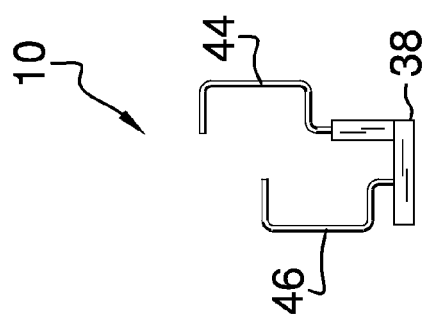
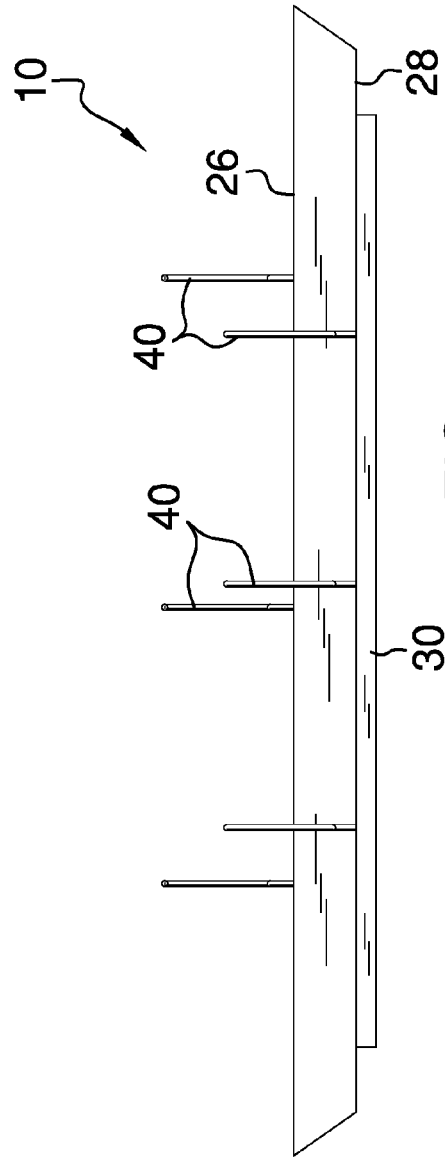
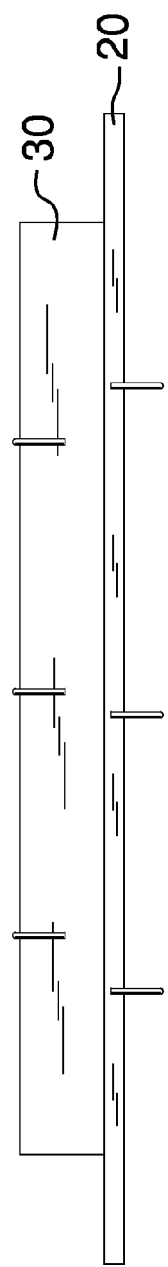

TRUCK BED STORAGE DEVICE

BACKGROUND OF THE INVENTION

Various types of storage devices for truck beds are known in the prior art. However, what has been needed is a truck bed storage device having a back support, a bottom support, and a plurality of a pair of ladder hooks. What has been further needed is for a rear edge of a top surface of the bottom support to be continuously disposed on a bottom side of the back support from proximal a right end to proximal a left end. Lastly, what has been needed is for each pair of the ladder hooks to comprise a forwardly facing ladder hook and a rearwardly facing ladder hook, with a bottom edge of each of the forwardly facing ladder hooks disposed within a top side of the back support and a bottom edge of each of the rearwardly facing ladder hooks disposed within the top surface of the bottom support. The bottom support is disposed on a bottom of a truck bed, and each of the right end of the back support and the left end of the back support are configured to slidably engage a right interior wall and a left interior wall of the truck bed, respectively. Thus, the truck bed storage device allows a user to securely store buckets, materials, equipment, groceries, and bags using at least one of the forwardly facing and rearwardly facing ladder hooks.

FIELD OF THE INVENTION

The present invention relates to storage devices, and more particularly, to a truck bed storage device.

SUMMARY OF THE INVENTION

The general purpose of the present truck bed storage device, described subsequently in greater detail, is to provide a storage device which has many novel features that result in a truck bed storage device which is not anticipated, rendered obvious, suggested, or even implied by prior art, either alone or in combination thereof.

To accomplish this, the present truck bed storage device comprises a back support having a right end, a left end, a top side, and a bottom side. The back support optionally a 2 inch by 4 inch stud. The truck bed storage device further comprises a bottom support having a top surface and a bottom surface. The bottom support is optionally a 2 inch by 6 inch stud. Each of the top surface and the bottom surface has a front edge and a rear edge. The rear edge of the top surface of the bottom support is continuously disposed on the bottom side of the back support from proximal the right end to proximal the left end. Each of the right end of the back support and the left end of the back support angle inward from the top side to the bottom side.

The truck bed storage device further comprises a plurality of a pair of ladder hooks. Each pair of ladder hooks comprises a forwardly facing ladder hook and a rearwardly facing ladder hook. Each of the forwardly facing ladder hook and the rearwardly facing ladder hook has a top edge and a bottom edge. The bottom edge of each of the forwardly facing ladder hooks is disposed within the top side of the back support. The bottom edge of each of the rearwardly facing ladder hooks is disposed within the top surface of the bottom support. The bottom support is disposed on a bottom of a truck bed. Each of the right end of the back support and the left end of the back support is configured to slidably engage a right interior wall and a left interior wall of the truck bed, respectively.

Thus has been broadly outlined the more important features of the present truck bed storage device so that the detailed description thereof that follows may be better understood and in order that the present contribution to the art may be better appreciated.

BRIEF DESCRIPTION OF THE DRAWINGS

Figures

FIG. 2 is a front elevation view.
FIG. 3 is a side elevation view.
FIG. 4 is a top plan view.

DETAILED DESCRIPTION OF THE DRAWINGS

Figure 1:
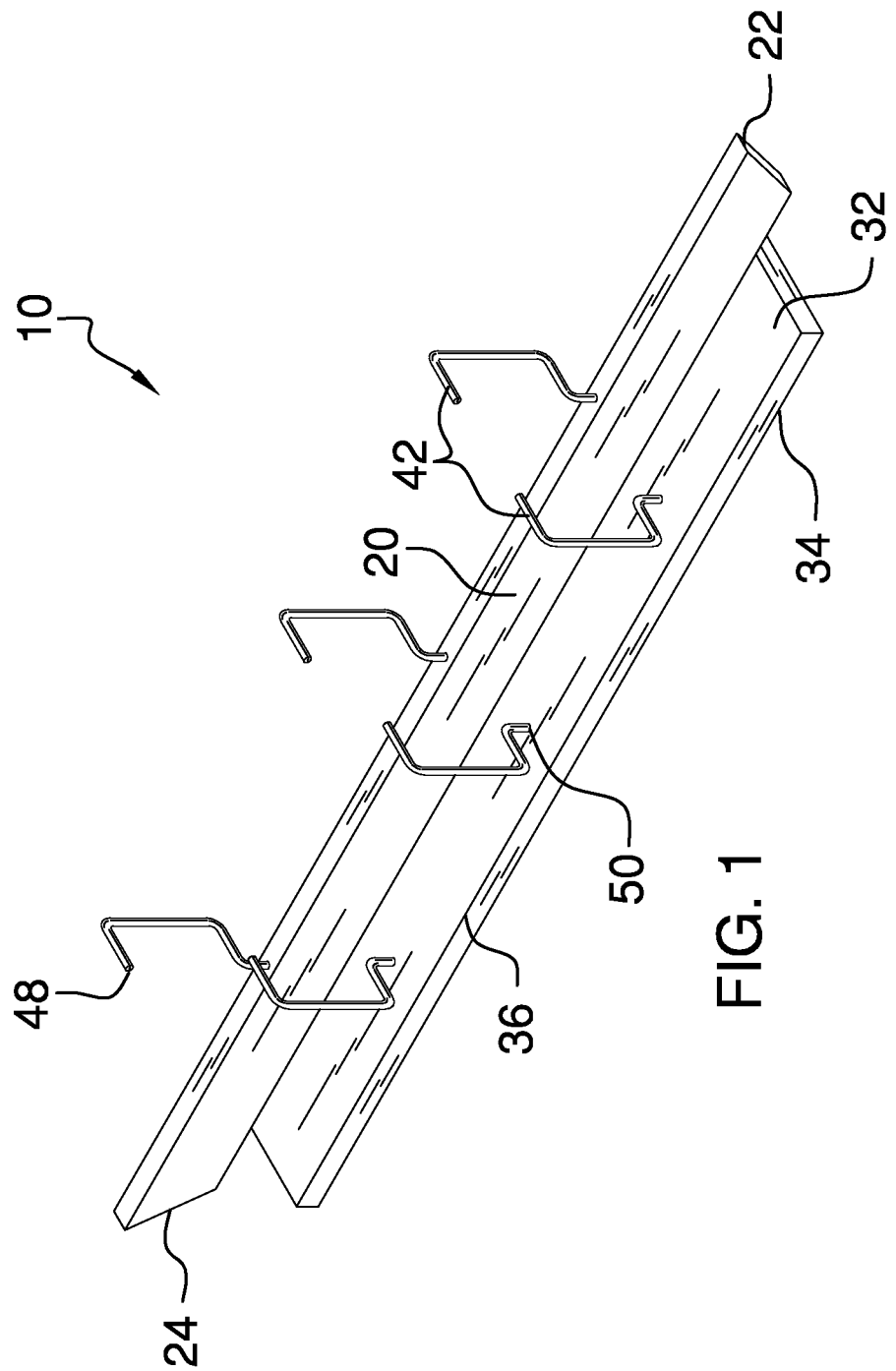
FIG. 1 is a front isometric view.
Figure 5:
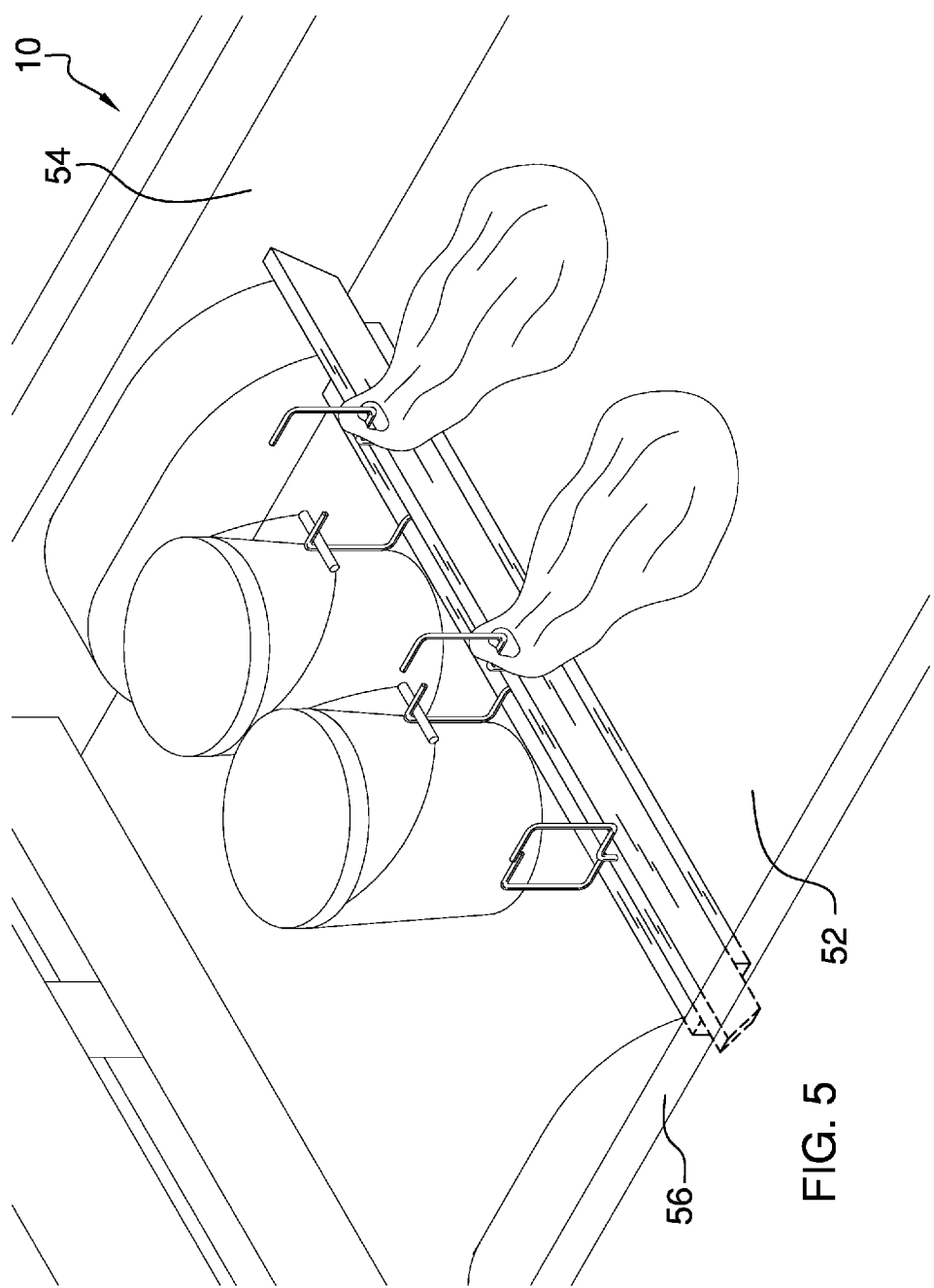
FIG. 5 is an in-use view.

With reference now to the drawings, and in particular FIGS. 1 through 5 thereof, an example of the instant truck bed storage device employing the principles and concepts of the present truck bed storage device and generally designated by the reference number 10 will be described.

Referring to FIGS. 1 through 5, the present truck bed storage device 10 is illustrated. The truck bed storage device 10 comprises a back support 20 having a right end 22, a left end 24, a top side 26, and a bottom side 28. The truck bed storage device 10 further comprises a bottom support 30 having a top surface 32 and a bottom surface 34. Each of the top surface 32 and the bottom surface 34 has a front edge 36 and a rear edge 38. The rear edge 38 of the top surface 32 of the bottom support 30 is continuously disposed on the bottom side 28 of the back support 20 from proximal the right end 22 to proximal the left end 24. As best shown in FIG. 2, each of the right end 22 of the back support 20 and the left end 24 of the back support 20 angle inward from the top side 26 to the bottom side 28.

The truck bed storage device 10 further comprises a plurality of a pair of ladder hooks 40. Each pair of ladder hooks 42 comprises a forwardly facing ladder hook 44 and a rearwardly facing ladder hook 46. Each of the forwardly facing ladder hook 44 and the rearwardly facing ladder hook 46 has a top edge 48 and a bottom edge 50. The bottom edge 50 of each of the forwardly facing ladder hooks 44 is disposed within the top side 26 of the back support 20. The bottom edge 50 of each of the rearwardly facing ladder hooks 46 is disposed within the top surface 32 of the bottom support 30. The bottom support 30 is disposed on a bottom of a truck bed 52. Each of the right end 22 of the back support 20 and the left end 24 of the back support 20 is configured to slidably engage a right interior wall 54 and a left interior wall 56 of the truck bed 52, respectively.

What is claimed is:
1. A truck bed storage device comprising:
a back support having a right end, a left end, a top side, and a bottom side;
a bottom support having a top surface and a bottom surface, each of the top surface and the bottom surface having a front edge and a rear edge, the rear edge of the bottom support top surface continuously disposed on the back support bottom side from proximal the right end to proximal the left end; and
a plurality of a pair of ladder hooks wherein each pair comprises a forwardly facing ladder hook and a rearwardly facing ladder hook, each of the forwardly facing ladder hook and the rearwardly facing ladder hook having a top edge and a bottom edge, the bottom edge of each of the forwardly facing ladder hooks disposed within the back support top side, the bottom edge of each of the rearwardly facing ladder hooks disposed within the bottom support top surface;

wherein each of the back support right end and the back support left end angle inward from the top side to the bottom side;

wherein the bottom support is disposed on a bottom of a truck bed, each of the back support right end and the back support left end configured to slidably engage a right interior wall and a left interior wall of the truck bed, respectively.

2. The truck bed storage device of claim 1 wherein the back support is a 2 inch by 4 inch stud.

3. The truck bed storage device of claim 2 wherein the bottom support is a 2 inch by 6 inch stud.

4. A truck bed storage device comprising:

a back support having a right end, a left end, a top side, and a bottom side;

wherein the back support is a 2 inch by 4 inch stud;

a bottom support having a top surface and a bottom surface, each of the top surface and the bottom surface having a front edge and a rear edge, the rear edge of the bottom support top surface continuously disposed on the back support bottom side from proximal the right end to proximal the left end;

wherein the bottom support is a 2 inch by 6 inch stud; and a plurality of a pair of ladder hooks wherein each pair comprises a forwardly facing ladder hook and a rearwardly facing ladder hook, each of the forwardly facing ladder hook and the rearwardly facing ladder hook having a top edge and a bottom edge, the bottom edge of each of the forwardly facing ladder hooks disposed within the back support top side, the bottom edge of each of the rearwardly facing ladder hooks disposed within the bottom support top surface;

wherein each of the back support right end and the back support left end angle inward from the top side to the bottom side;

wherein the bottom support is disposed on a bottom of a truck bed, each of the back support right end and the back support left end configured to slidably engage a right interior wall and a left interior wall of the truck bed, respectively.

* * * * *